(12) United States Patent
Liu

(10) Patent No.: US 6,427,290 B1
(45) Date of Patent: Aug. 6, 2002

(54) APPARATUS FOR FASTENING WIRE OF ELECTRONIC DEVICE

(75) Inventor: Chia-Fu Liu, Taoyuan Hsien (TW)

(73) Assignee: Delta Electronics, Inc. (CN)

( * ) Notice: Subject to any disclaimer, the term of this patent is extended or adjusted under 35 U.S.C. 154(b) by 0 days.

(21) Appl. No.: 09/351,790

(22) Filed: Jul. 12, 1999

(51) Int. Cl.7 .............................................. B65D 63/10
(52) U.S. Cl. ....................................................... 24/16 R
(58) Field of Search ........................... 439/501; 248/51, 248/52, 74.3; 24/300–302, 306, 298, 16 R, 16 PB; 174/50; 15/323

(56) References Cited

U.S. PATENT DOCUMENTS

| | | | | |
|---|---|---|---|---|
| 2,721,624 A | * | 10/1955 | Osborn | |
| 3,152,219 A | * | 10/1964 | Murray et al. | |
| 3,275,969 A | * | 9/1966 | Sheeran | |
| 4,182,005 A | * | 1/1980 | Harrington | |
| 4,289,366 A | * | 9/1981 | Marks | |
| 4,609,171 A | * | 9/1986 | Matsui | |
| 4,940,427 A | * | 7/1990 | Pearson | |
| 5,040,263 A | * | 8/1991 | Guhne et al. | |
| 5,176,343 A | * | 1/1993 | Cheney, II et al. | |
| 5,388,155 A | * | 2/1995 | Smith | |
| 5,502,877 A | * | 4/1996 | Yocum | |
| 5,507,667 A | * | 4/1996 | Hahn et al. | |
| 5,697,809 A | * | 12/1997 | Chung | |
| 5,720,628 A | * | 2/1998 | Usui et al. | |
| 5,802,676 A | * | 9/1998 | Tolan | |
| 5,806,943 A | * | 9/1998 | Dell et al. | |

* cited by examiner

Primary Examiner—James R. Brittain
(74) Attorney, Agent, or Firm—Greer, Burns & Crain, Ltd.

(57) ABSTRACT

The apparatus for fastening a wire of an electronic device to a housing of the electronic device includes a belt mounted on the housing of the electronic device and a fastening device mounted on the belt for securing the wire to the housing. The wire of the electronic device is fastened to a surface of the housing. Therefore, the wire is not suspended from the electronic device. Furthermore, the belt for fastening the wire is mounted on the housing of the electronic device and will not be lost easily.

5 Claims, 5 Drawing Sheets

APPARATUS FOR FASTENING WIRE OF ELECTRONIC DEVICE

FIELD OF THE INVENTION

The present invention is related to an apparatus for fastening a wire of an electronic device, and more particularly to an apparatus for fastening a wire of an adapter.

BACKGROUND OF THE INVENTION

Generally, an electronic device usually includes an adapter for changing an alternating current to a direct current, such as a printer and a modem. Please refer to a FIG. 1 which shows an adapter of an electronic device of the prior art. There is a binding belt 13 for fastening the wire 12 of the adapter 11. When the electronic device is going to be operated, the user has to loosen the belt 13, stretch the wire 12, and then plug in the adapter.

The disadvantages of the conventional adapter include:

(1) The belt 13 is apart from the adapter 11 and the wire 12. The user has to store the belt in another place. The belt will be lost easily if the user do not store the belt very carefully. It is inconvenient for users to fasten a wire of an adapter used in a portable computer in this way.

(2) When the wire 12 is fastened by the belt 13, the wire 12 is still suspended from the adapter 11 and may be hooked by a nail.

Therefore, it is attempted by the applicant to solve the problem encountered in the prior art.

SUMMARY OF THE INVENTION

A first object of the present invention is to provide an apparatus for fastening a wire of an electronic device.

A second object of the present invention is to provide an apparatus for fastening the wire of the electronic device to the housing of the electronic device.

A third object of the present invention is to provide an apparatus for fastening a wire of an adapter to the housing of the adapter.

According to the present invention, the apparatus for fastening the wire of the electronic device includes a belt mounted on the housing of the electronic device and a fastening device mounted on the belt for securing the wire to the housing.

In accordance with one aspect of the present invention, the fastening device includes a first engaging element and a second engaging element. The first engaging element is mounted on a first end of the belt and the second engaging element is mounted on a second end of the belt for correspondingly engaging therewith the first engaging element in order to secure the wire to the housing.

In one preferred embodiment, the first engaging element is a Velcro hook fiber and the second engaging element is a Velcro pile.

In another preferred embodiment, the first engaging element is a male buckle and the second engaging element is a female buckle.

In accordance with another aspect of the present invention, the fastening device includes a male buckle mounted on one end of the belt.

In accordance with another aspect of the present invention, the housing further includes a female buckle provided on an outer surface of the housing for engaging therewith the male buckle of the fastening device in order to secure the wire to the housing.

In accordance with another aspect of the present invention, the fastening device includes a hook mounted on one end of the belt.

In accordance with another aspect of the present invention, the housing further includes a groove provided on an outer surface of the housing for engaging therein the hook of the fastening device in order to secure the wire to the housing.

In accordance with another aspect of the present invention, the electronic device is an adapter.

In accordance with another aspect of the present invention, the belt is made of an elastic material.

In another preferred embodiment of the present invention, a device for fastening a wire of an adapter to a housing of the adapter includes a belt mounted on the housing of the adapter, a first engaging element mounted on a first end of the belt, and a second engaging element for engaging therewith the first engaging element so as to secure the wire to the housing.

The present invention may best be understood through the following description with reference to the accompanying drawings, in which:

DETAILED DESCRIPTION OF THE PREFERRED EMBODIMENTS

Figure 1:
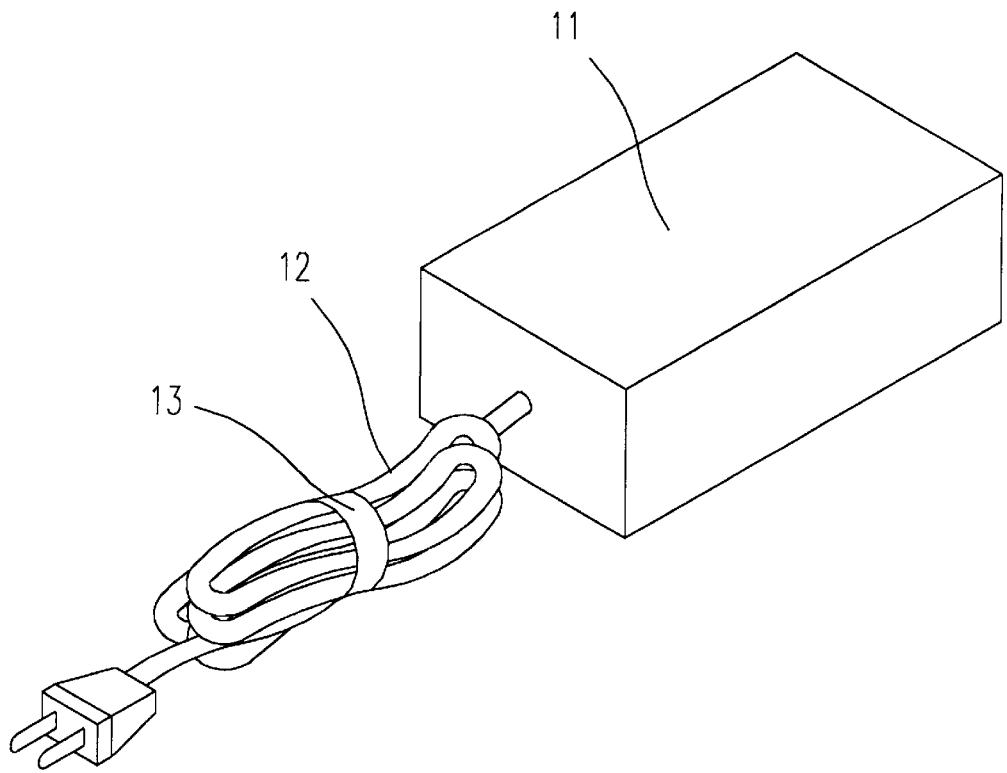
FIG. 1 is a schematic diagram showing an adapter of the prior art.
Figure 2:
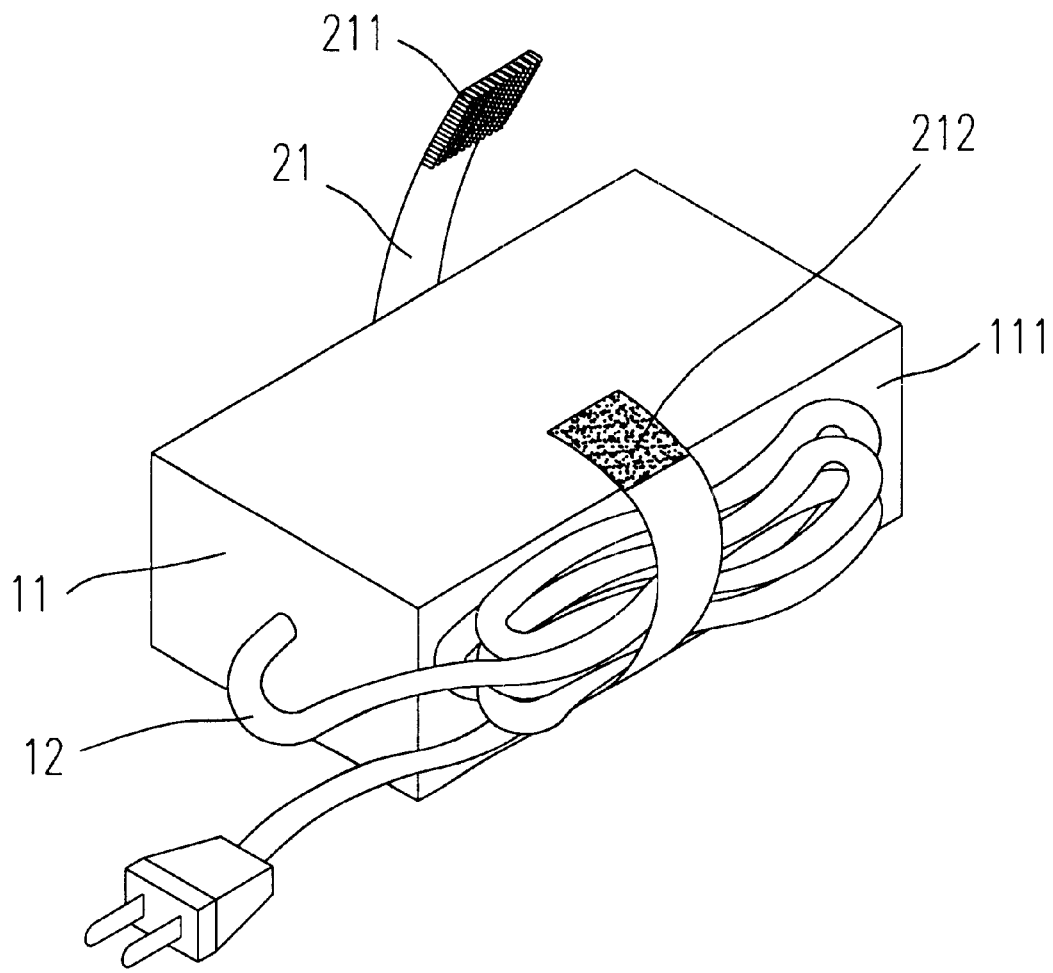
FIG. 2 is a schematic diagram showing a first preferred embodiment of the present invention.

Please refer to FIG. 2 which is a diagram showing a first embodiment of the present invention. The apparatus for fastening the wire 12 of the electronic device includes a belt 21 and a fastening device mounted on the belt 21 for securing the wire 12 to a surface 111 of the housing 11. The electronic device is an adapter. The belt 21 is mounted on another surface (not shown) of the housing 11. The belt 21 is made of an elastic material.

In FIG. 2, the fastening device includes a first engaging element mounted on an end of the belt 21 and a second engaging element mounted on an opposite end of the belt. The second engaging element is correspondingly engaged with the first engaging element in order to secure the wire 12 to the housing 11 of the adapter. In the first embodiment of the present invention, the first engaging element is a Velcro hook fiber 211 and the second engaging element is a Velcro pile 212. The Velcro hook fiber 211 is engaged with the Velcro pile 212 for fastening the wire 12 to the surface 111 of the housing 11. Therefore, the wire 12 of the adapter is secured to the surface 111 of the housing 11 of the adapter. The wire 12 is thus no longer suspended from the adapter. In addition, the belt 21 for fastening the wire 12 is mounted on the housing 11 of the adapter and will not be lost easily.

Figure 3:
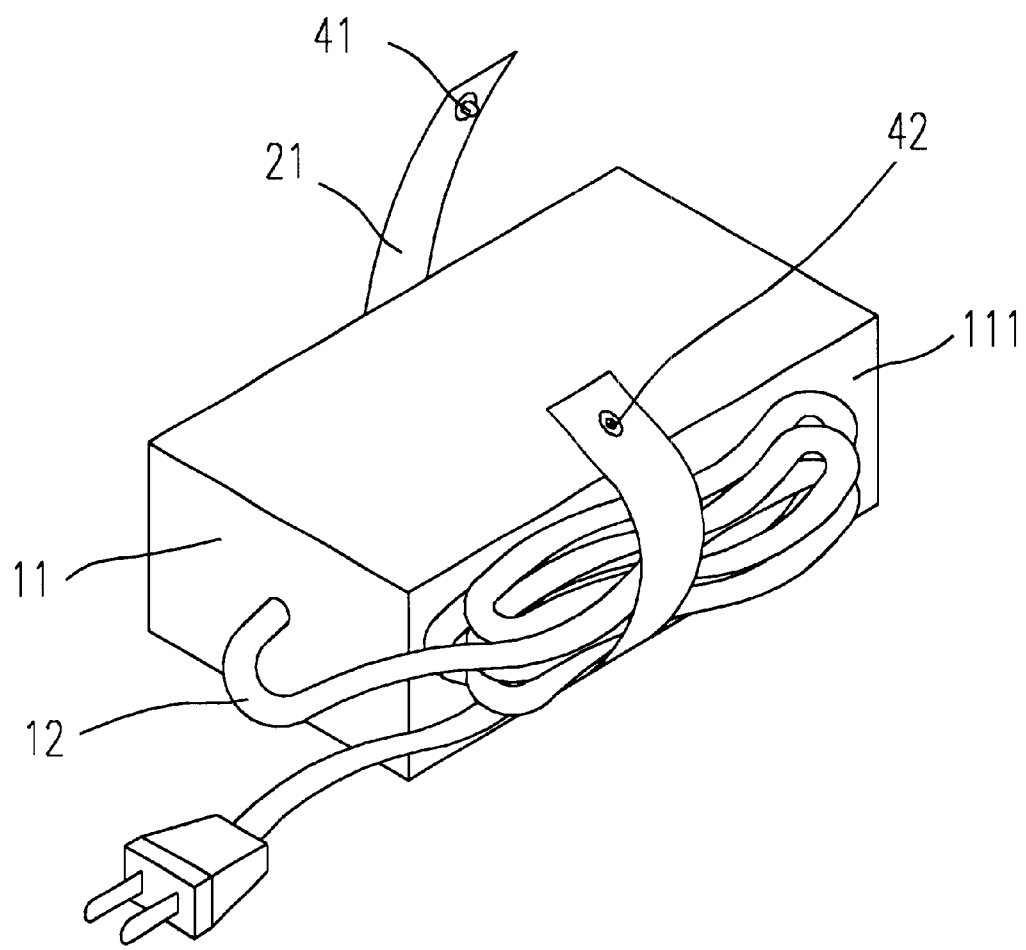
FIG. 3 is a schematic diagram showing a second preferred embodiment of the present invention.

Please refer to FIG. 3 which shows a second embodiment of the present invention. In FIG. 3 the first engaging element is a male buckle 41 and the second engaging element is a female buckle 42. The male buckle 41 and the female buckle 42 are fastened together so as to secure the wire 12 of the adapter to the surface 111 of the housing 11.

Figure 4:
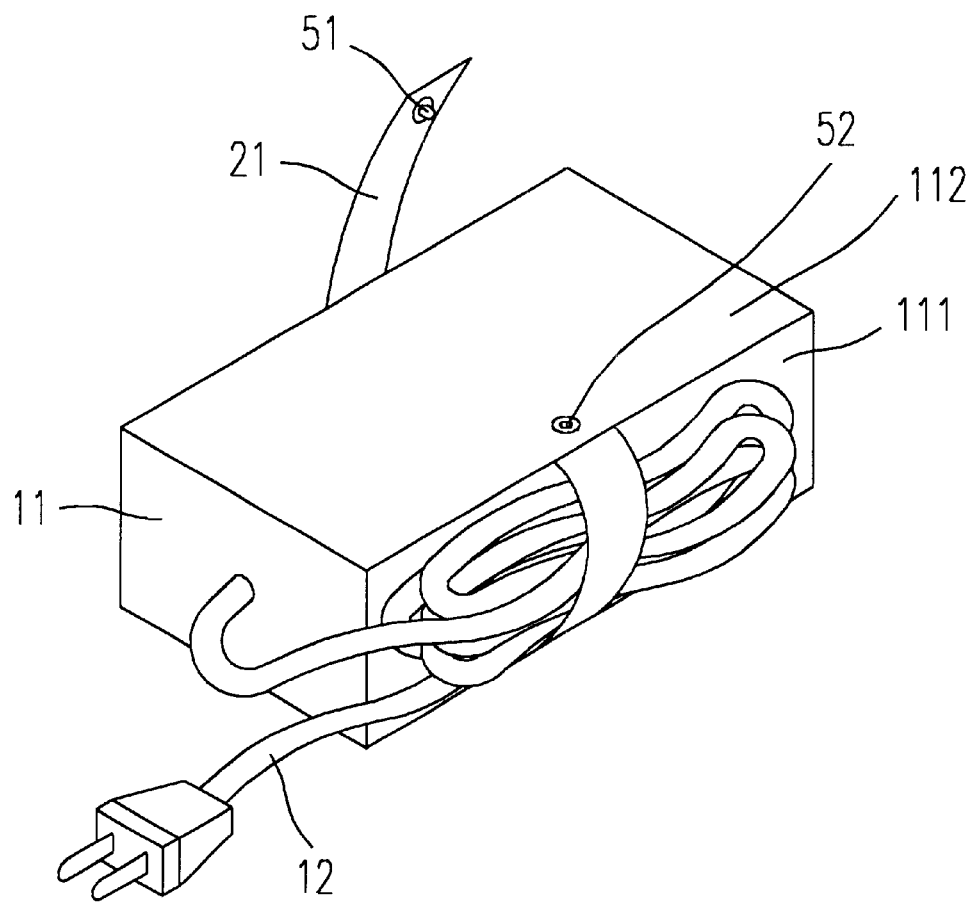
FIG. 4 is a schematic diagram showing a third preferred embodiment of the present invention.

Please refer to FIG. 4 which shows a third embodiment of the present invention. The fastening device is a male buckle 51 mounted on one end of the belt 21. The other end of the belt is secured to a surface 112 of the housing 11 of the adapter. There is a female buckle 52 provided on the surface 112 of the housing 11 for engaging therewith the male buckle 51 so as to secure the wire 12 to the surface 111 of the housing 11.

Figure 5:
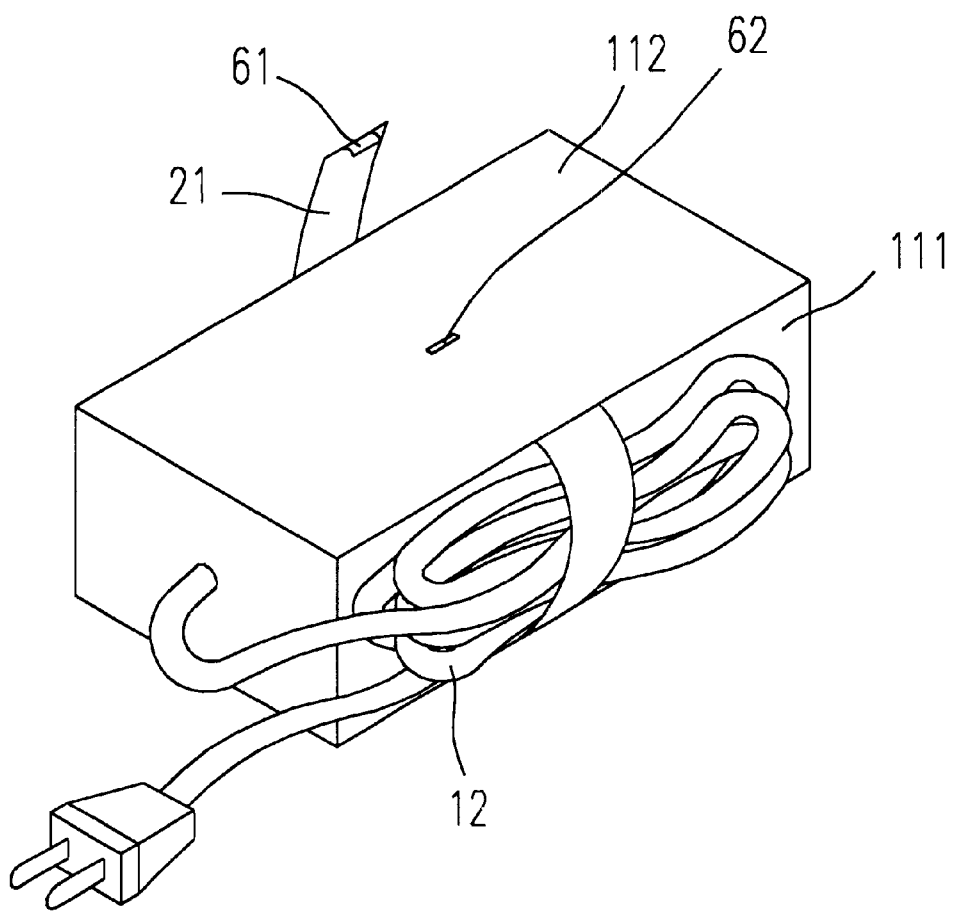
FIG. 5 is a schematic diagram showing a fourth preferred embodiment of the present invention.

Please refer to FIG. 5 which shows a fourth embodiment of the present invention. One end of the belt is secured to the surface 112 of the housing 11. The fastening device is a hook 61 mounted on the other end of the belt 21. There is a groove 62 provided in the surface 112 of the housing 11 for receiving the hook 61 so as to secure the wire 12 to the surface 111 of the housing 11.

In conclusion, the apparatus of the present invention includes a belt mounted on the housing of the electronic device, a first engaging element mounted on the belt, and a second engaging element correspondingly engaging therewith the first engaging element for securing the wire of the electronic device to the housing of the electronic device. The wire of the electronic device can be fastened to a surface of the housing. Therefore, the wire will no longer be suspended from the electronic device. In addition, the belt for fastening the wire is mounted on the housing and will not be lost easily.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for fastening a wire of an adapter to a housing of said adapter comprising:
    a belt having an end fixedly attached to said housing of said adapter;
    a first engaging element having a hook mounted on the other end of said belt; and
    a second engaging element having a groove in a surface of said housing for receiving said first engaging element so as to secure said wire to said housing.

2. The apparatus according to claim 1, wherein said belt is made of an elastic material.

3. An apparatus for fastening a wire of an electronic device to a housing of said electronic device, said wire extending outwardly from a first surface of said housing, comprising:
    a belt having an end fixedly attached to said housing;
    a first engaging element having a hook mounted on the other end of said belt; and
    a second engaging element having a groove in a second surface of said housing for engaging therewith said first engaging element so as to secure said wire to a third surface of said housing.

4. The apparatus according to claim 3, wherein said electronic device is an adapter.

5. The apparatus according to claim 3, wherein said belt is made of an elastic material.

* * * * *